United States Patent
Amerling et al.

(10) Patent No.: US 10,202,180 B1
(45) Date of Patent: Feb. 12, 2019

(54) OUTBOARD MOTOR AND PROTECTIVE COVERING WITH RIGGING TRAY FOR OUTBOARD MOTOR

(71) Applicant: Brunswick Corporation, Lake Forest, IL (US)

(72) Inventors: Steven J. Amerling, Fond du Lac, WI (US); Timothy D. Krupp, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 374 days.

(21) Appl. No.: 15/183,083

(22) Filed: Jun. 15, 2016

Related U.S. Application Data (60) Provisional application No. 62/286,612, filed on Jan. 25, 2016.

(51) Int. Cl.
*B63H 20/32* (2006.01)
*H02G 15/06* (2006.01)
*H02G 15/013* (2006.01)

(52) U.S. Cl.
CPC .......... *B63H 20/32* (2013.01); *H02G 15/013* (2013.01); *H02G 15/06* (2013.01)

(58) Field of Classification Search
CPC ....... B63H 20/32; H02G 15/013; H02G 15/06
See application file for complete search history.

(56) References Cited

U.S. PATENT DOCUMENTS

| | | | |
|---|---|---|---|
| 3,950,059 A | 4/1976 | Anhalt et al. | |
| 4,933,809 A | 6/1990 | Boede et al. | |
| 4,969,847 A | 11/1990 | Curtis et al. | |
| 5,007,858 A | 4/1991 | Daly et al. | |
| 6,183,322 B1 * | 2/2001 | Takahashi | B63H 21/265 440/76 |
| 6,257,940 B1 | 7/2001 | Dunham et al. | |
| 6,273,771 B1 | 8/2001 | Buckley et al. | |
| 6,364,724 B1 * | 4/2002 | Nozawa | F02B 61/045 277/637 |
| 6,960,108 B1 * | 11/2005 | Jaszewski | F16L 3/23 174/152 G |
| 6,991,500 B1 * | 1/2006 | Gulko | B63H 20/32 123/195 P |
| 7,104,856 B1 | 9/2006 | Krupp et al. | |

(Continued)

*Primary Examiner* — S. Joseph Morano
*Assistant Examiner* — Jovon E Hayes
(74) *Attorney, Agent, or Firm* — Andrus Intellectual Property Law, LLP (57) ABSTRACT

An outboard motor includes an engine coupled in torque-transmitting relationship with a propulsor via a driveshaft. A protective covering for the outboard motor includes a cowl that houses the engine within a closed interior thereof. An opening in an outer surface of the cowl provides access to the closed interior. A rigging tray can be inserted through the opening to a retracted position, in which a majority of the rigging tray is within the closed interior. A plurality of electrical lines extends from the engine and into the rigging tray from a first end thereof. Each electrical line in the plurality of electrical lines terminates in the rigging tray at a respective one of a plurality of electrical connectors. A second end of the rigging tray receives a complementary plurality of vessel electrical lines for connection to the plurality of engine electrical lines via the plurality of electrical connectors.

20 Claims, 6 Drawing Sheets

(56) References Cited

U.S. PATENT DOCUMENTS

| | | | |
|---|---|---|---|
| 7,144,283 B2 | 12/2006 | Kawase | |
| 7,267,592 B1 * | 9/2007 | Ingebritson | B63H 20/32 123/195 P |
| 7,704,109 B2 * | 4/2010 | Arai | B63H 20/32 440/76 |
| 8,858,280 B1 * | 10/2014 | Wiegele | B63H 20/32 123/195 C |

* cited by examiner

OUTBOARD MOTOR AND PROTECTIVE COVERING WITH RIGGING TRAY FOR OUTBOARD MOTOR

CROSS REFERENCE TO RELATED APPLICATION

The present application claims the benefit of U.S. Provisional Application Ser. No. 62/286,612, filed Jan. 25, 2016, which is hereby incorporated by reference herein.

FIELD

The present disclosure relates to outboard motors and to protective coverings (for example, cowls) for outboard motors that are to be coupled to a transom of a marine vessel.

BACKGROUND

The following U.S. patents and publications are hereby incorporated by reference herein.

U.S. Pat. No. 4,933,809 discloses a modular assembly of diverse electrical components for operation of an outboard motor, including a box in which the components are inserted and/or mounted and prewired. External leads are organized for passage through a few specially located openings in the box for external connection. The fully assembled and prewired assembly is enclosed with a demountable cover and attached directly to the engine block. The modular assembly alleviates indiscriminate component mounting and corresponding disarray of interconnecting lead wires. In addition, the moisture and corrosion resistance of the components is enhanced.

U.S. Pat. No. 4,969,847 discloses a strain relief assembly for an outboard motor for relieving strain on wires, cables, lines or the like that extend between the boat and the cowl assembly, which encloses the power head of the outboard motor. The strain relief assembly is preferably disposed within an opening formed in one of the cowl sections, and comprises a two-piece member. The two-piece member includes a series of indentations which cooperate to clamp the wires, cables, lines or the like therebetween when screwed together. With the strain relief assembly fixed to the wall of the cowl section forming the opening, this acts to maintain the wires, cables or lines in position relative to the cowl section for relieving strain thereon during movement of the outboard motor. A fuel line strain relief assembly is also provided, comprising a stem fixed to the two-piece member. An external fuel line supplies fuel to the stem, which is communicated therethrough to an internal fuel line extending between the stem and the power head.

U.S. Pat. No. 6,960,108 discloses a protective containment device that serves as a strain relief component for hoses, wires, and push-pull cables extending through a front surface of an outboard motor. The protective containment device is formed from first and second portions that are assembled together with a flexibly connected divider that segregates certain components within the protective device from other components. A cylindrical ring, made of first and second retainers, is disposed around an outer surface of the cylindrical conduit to hold the first and second portions together and to retain a flexible tube in place.

U.S. Pat. No. 7,104,856 discloses a rigging apparatus for an outboard motor in which an attachment member is shaped to be rigidly attached to a housing structure, or cowl, of an outboard motor, without the need for additional hardware such as clamps, brackets, or screws. The attachment member is shaped to receive a threaded sleeve in threaded association therewith so that hoses, wires, and cables can be protected within the threaded sleeve. An attachment member of the rigging apparatus is made to be asymmetrical to avoid improper assembly into an opening of the housing structure of an outboard motor.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, an outboard motor includes an engine coupled in torque-transmitting relationship with a propulsor via a driveshaft and a protective cowl that houses the engine within a closed interior thereof. An opening in an outer surface of the cowl provides access to the closed interior. A rigging tray is configured to be inserted through the opening to a retracted position, in which a majority of the rigging tray is within the closed interior. A plurality of electrical lines extends from the engine and into the rigging tray from a first end thereof. Each electrical line in the plurality of electrical lines terminates in the rigging tray at a respective one of a plurality of electrical connectors.

According to another example of the present disclosure, a protective covering for an outboard motor's engine includes a cowl that houses the engine within a closed interior thereof. An opening in an outer surface of the cowl provides access to the closed interior. The protective covering also includes a rigging tray having a first end configured to receive a plurality of engine electrical lines that terminate in the rigging tray at a plurality of electrical connectors, respectively and a second end configured to receive a complementary plurality of vessel electrical lines for connection to the plurality of engine electrical lines via the plurality of electrical connectors. The rigging tray is configured to be inserted through the opening to an installed position, in which a majority of the rigging tray is within the closed interior. The rigging tray is also configured to be removed through the opening to a withdrawn position, in which a majority of the rigging tray is exterior to the cowl.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
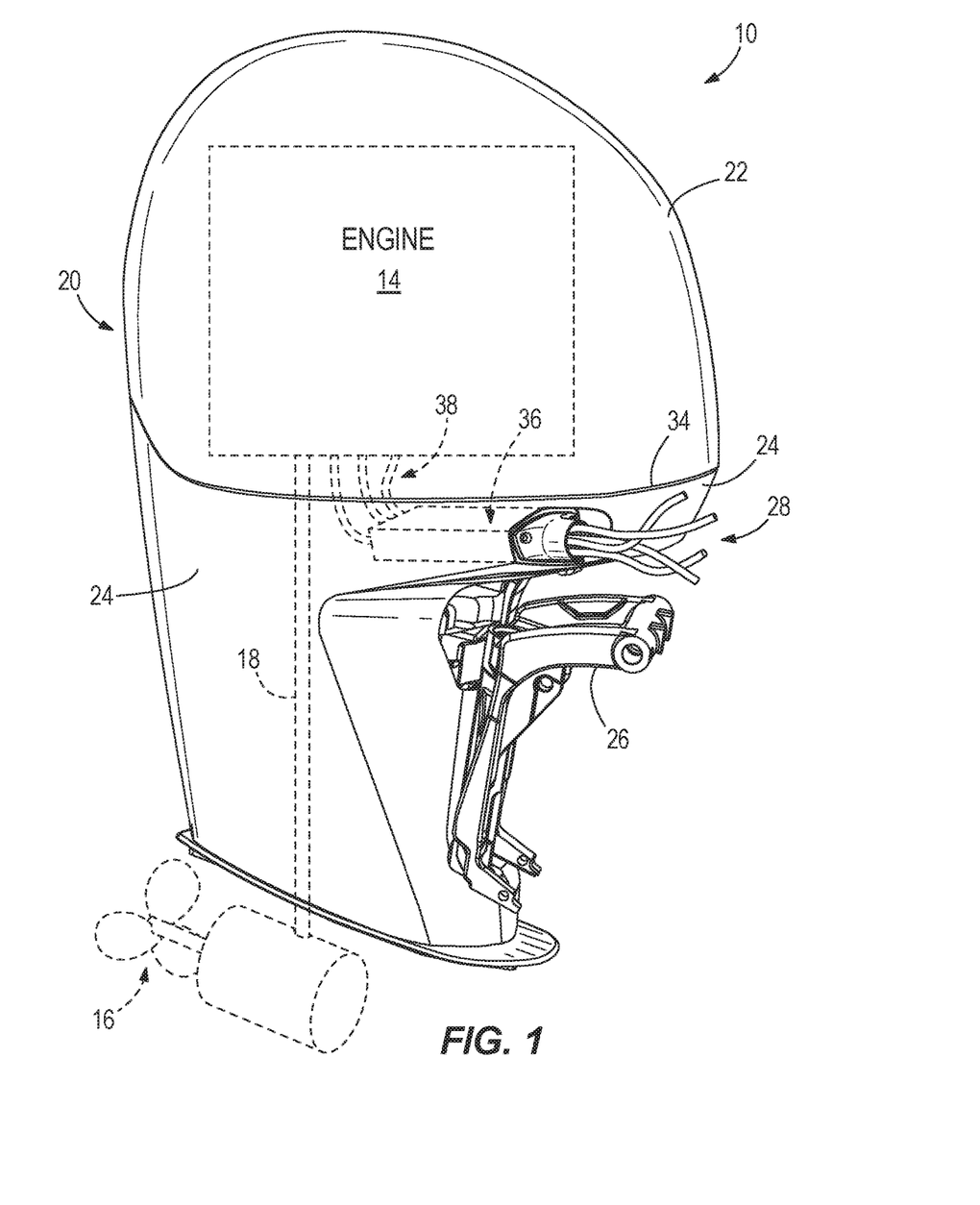
FIG. 1 is a perspective view of a portion of an outboard motor according to the present disclosure.

FIG. 1 illustrates an outboard motor 10 for coupling to a transom of a marine vessel. The outboard motor 10 includes an engine 14 coupled in torque-transmitting relationship with a propulsor 16 via a driveshaft 18 and a number of gear sets, as known to those having ordinary skill in the art. The engine 14 could be any type of engine, such as a heat engine powered by gasoline or diesel or a motor powered by electricity, and specifics of the engine are not limiting on the scope of the present disclosure. Similarly, the propulsor 16, although shown herein as a single propeller, could be any type of propulsor such as a dual counter-rotating propeller, a jet drive, an impeller, etc., and is not limiting on the scope of the present disclosure. The outboard motor 10 also includes a protective covering or cowl 20 that houses the engine 14 therein. The cowl 20 may include an upper cowl portion 22 and a lower cowl portion 24, although other configurations for protective coverings over the engine 14 and related outboard motor components could be provided.

The outboard motor 10 is configured to be coupled to the transom of the marine vessel by way of a transom bracket (not shown) and a swivel bracket 26. The swivel bracket 26 shown here is relatively standard, and it should be noted that other configurations and/or types of transom and swivel brackets or outboard motor mounting systems could be used. By way of actuators provided on the transom, the transom bracket, or the swivel bracket 26, the outboard motor 10 can be steered, tilted, trimmed, and moved in various ways in order to provide different directions of propulsive force to propel the marine vessel in different directions. Commands to move the outboard motor 10 in such a manner can be provided by various outboard motor-related devices aboard the marine vessel. For example, steering, tilt, and trim commands can be input by an operator at the helm of the marine vessel.

Typically, various hoses, wires, cables, or the like (see lines shown at 28) extend between the marine vessel and the outboard motor 10 coupled to the vessel's transom, which lines terminate in the interior of the cowl 20. For example, the electrical system for an internal combustion engine-driven outboard motor includes a wide variety of diverse electrical control components. An engine harness may extend between the engine and a helm of the marine vessel. The engine harness contains electrical lines that relay digital steering, throttle, and shift commands between the helm and the engine. Electrical lines relaying other types of control signals may also be present. Additionally, in most applications, positive and negative battery cables run between a battery housed within the vessel and terminals provided on or near the engine. Moreover, a fuel line may supply fuel to the engine from a fuel tank housed within the vessel.

For reasons of convenience, most of the above-mentioned electrical control components are preferably mounted on or closely adjacent the engine 14. Operating power for the electrical system and for charging the battery is generated by an alternator incorporated into the engine flywheel, and other components utilized in the direct control of engine operation—such as a voltage regulator and a spark ignition system—are most conveniently located in close proximity to the alternator and the engine 14. When the engine 14 is a heat engine, a fuel line also connects to the engine 14 to provide fuel for combustion.

Many of the electrical control components are subject to high corrosion and/or their performance is adversely affected if they get wet. Obviously, the environment in which an outboard motor 10 is operated is highly conducive to corrosion and moisture problems. Although the protective covering or cowl 20 provides some protection, most engine-mounted electrical components are still subject to corrosive attack as well as the possibility of becoming damp or wet. Further, during movement of the outboard motor 10, such as steering or tilting, the above-described wires and cables often experience strain resulting from contact between the wires and cables and the wall of an opening (32, FIGS. 2-4) in the lower cowl portion 24 through which the wires and cables extend. Such strain is detrimental, and may ultimately result in failure of the wires and cables upon continued such movement of the outboard motor 10.

Current outboard motor rigging systems either require that a plurality of vessel-sourced electrical lines 28 be brought through the cowl opening 32 and then connected to the engine 14, or provide short engine-sourced electrical lines 38 that are long enough to be fished through the opening 32 and thereafter connected to the vessel-sourced electrical lines exterior to the cowl. Both of these processes are time-consuming, especially as more functions are provided on engines and more communicative connections with the vessel are required to facilitate those functions. Additionally, hand access via the small opening 32 is very difficult. As engines have increased in horsepower, they have also been packaged more tightly so that space between the cowl 20 and the engine 14 has decreased, exacerbating the above-mentioned problems.

Generally, because of where electrical lines connect to the engine 14, outboard motor installers will guide the lines through the cowl 20 by way of an opening that is located on a front starboard side (or in other examples, on the front port side) of the outboard motor 10, just below a joint 34 where the upper cowl portion 22 meets the lower cowl portion 24. However, in most prior art outboards, the intake runners and other components for the engine are in the way of hand access to this area. For example, if an installer removes the upper cowl portion 22 in order to reach his or her hand down into the lower cowl portion 24 to connect a number of vessel electrical lines to a number of engine electrical lines there, the engine components will make such connection difficult. Of course, the installer could remove the lower cowl portion 24; however, the lower cowl portion 24 is much more difficult to remove than is the upper cowl portion 22. A number of fasteners and a rubber seal must be removed before the lower cowl portion 24 can be removed, which requires quite a bit of time during installation. Another alternative would be to provide a door on the outside of the cowl 20 that allows access to the engine electrical lines. However, for some engines, especially those that are equipped with many functions and require a number of lines to provide communication for commands related to those functions, by the time all of the lines are brought to this area, there is only a very small opening left between the lines and the access door area. Additionally, a door does not provide as watertight of a seal as would otherwise be desired.

The rigging system of the present disclosure provides several advantages over prior art systems and methods, which required a person installing the outboard motor 10 to pull the engine electrical lines 38 out of the cowl 20 or push the vessel electrical lines 28 into the cowl 20 by way of the small opening 32, next pull the cables through several holes in a rubber grommet, and then clamp around the grommet to provide a connection to the cowl 20. The present inventors have realized that the above-mentioned problems could be solved if the rigging connections could be made outside of the cowl 20 but then tucked away thereafter, as well as if all the electrical connections could be made in one place. Additionally, the outboard motor 10 and protective covering of the present disclosure do not require a person who installs the outboard motor 10 to work with his hands inside the constrained space of the small opening 32.

Figure 2:
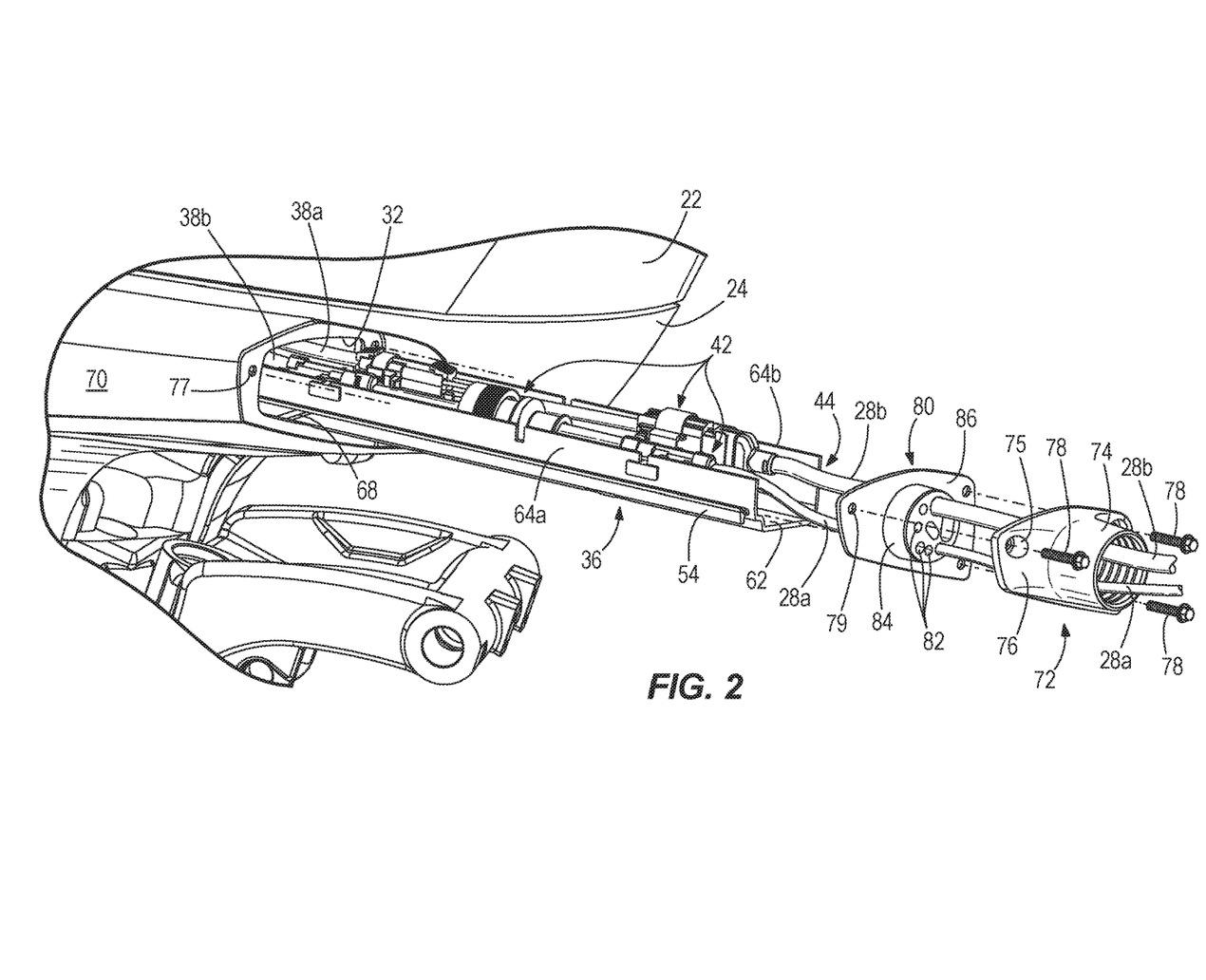
FIG. 2 is a close-up view of a portion of the outboard motor, showing a rigging tray and associated components according to the present disclosure in an extended or withdrawn position.
Figure 3:
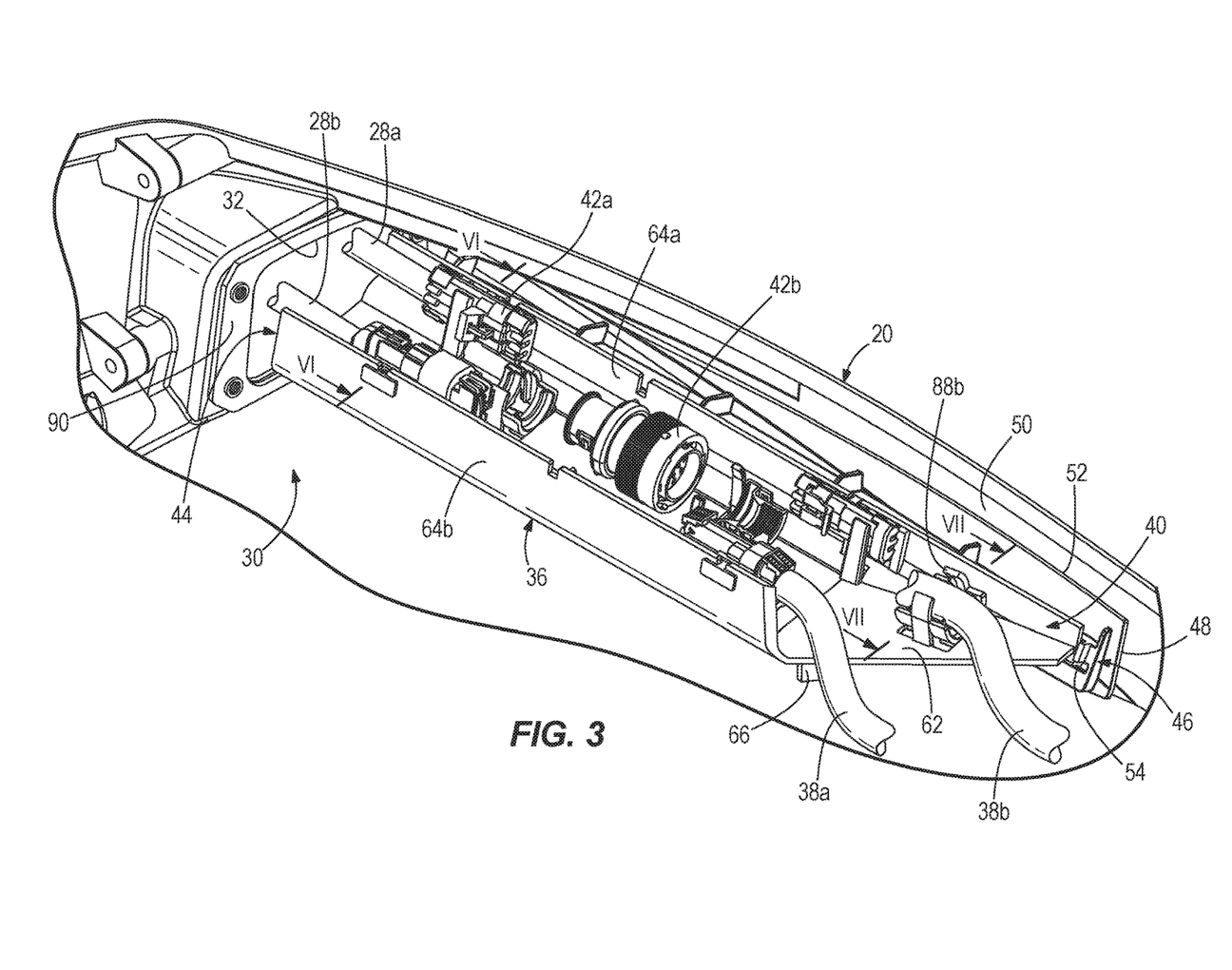
FIG. 3 is a view of a portion of an interior of the cowl of the outboard motor, showing the rigging tray from another angle, and in a retracted or installed position.
Figure 4:
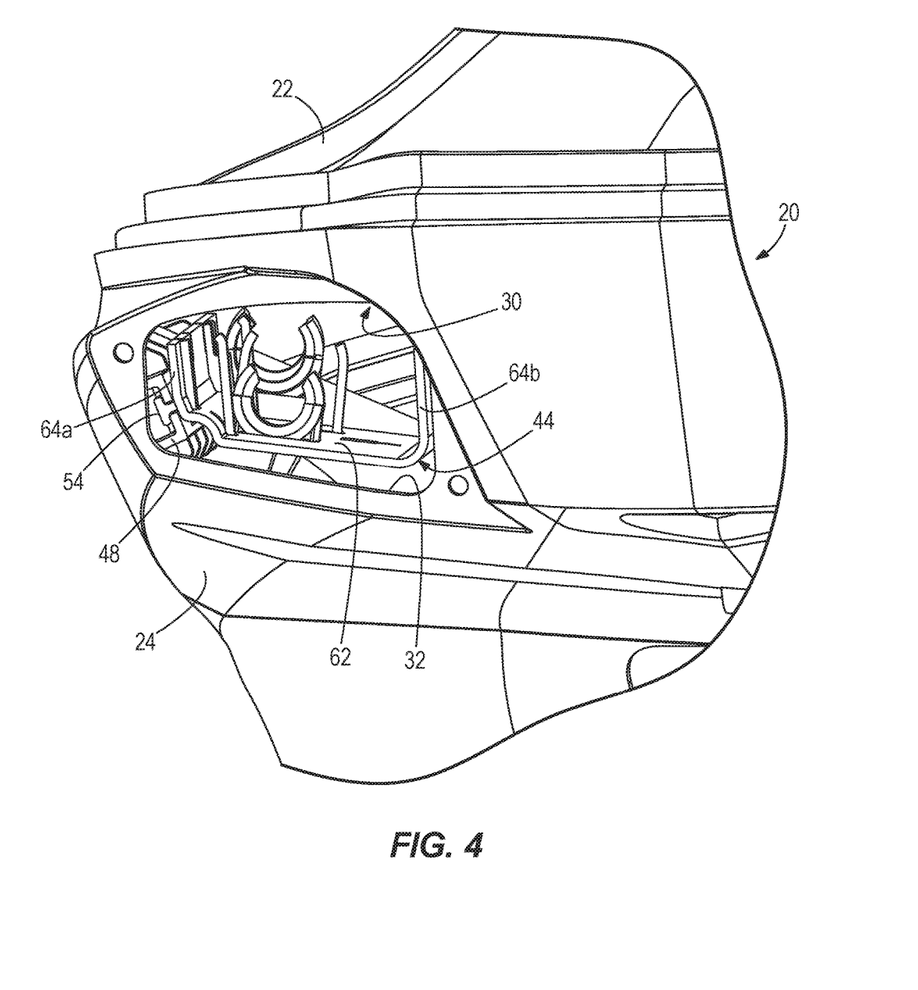
FIG. 4 is a view of a portion of the exterior of the cowl, showing the rigging tray in the retracted or installed position.

As noted above, the outboard motor 10 of the present disclosure includes an engine 14 and a protective cowl 20 that houses the engine 14 within a closed interior 30 (FIGS. 3-5) thereof. The cowl 20 extends down to a driveshaft housing, and the driveshaft housing to a gear case, as is known. Together, these elements serve as a protective covering for the outboard motor 10 and protect the internal components of the outboard motor 10 from rain, wind, water, dirt, physical contact, etc. Turning briefly to FIGS. 2-4, an opening 32 is provided in an outer surface 70 of the cowl 20, more specifically in the lower cowl portion 24, just below a joint 34 where the lower cowl portion 24 meets the upper cowl portion 22. As mentioned above, the opening 32 provides access to the closed interior 30 of the cowl 20 and provides passage for electrical lines 28, 38 that connect the engine 14 to components on the vessel.

According to the present disclosure, a rigging tray 36 is configured to be inserted through the opening 32, which rigging tray 36 facilitates easier connection of vessel electrical lines 28 to engine electrical lines 38, as will be described below. FIGS. 1, 3, and 4 show the rigging tray 36 in a retracted position, in which a majority of the rigging tray 36 is within the closed interior 30 of the cowl 20. The rigging tray 36 is designed and located such that a plurality of engine electrical lines 38 can extend from the engine 14 and into the rigging tray 36 from a first end 40 thereof. These engine electrical lines 38 are coupled to the engine 14 at various locations, where they are needed to provide power, communications, and other commands to the engine 14. The engine electrical lines 38 are shown only in part in the drawings, such as at 38a, 38b in FIGS. 2 and 3, so as not to obscure the rigging tray 36 shown therein. It should be noted that many more lines than those shown at 38a and 38b can be provided, and even more than those shown at 38 in FIG. 1, according to the specifics of the engine 14. Each electrical line in the plurality of engine electrical lines 38 terminates in the rigging tray 36 at a respective one of a plurality of electrical connectors 42. The plurality of electrical connectors 42 and how they are situated within the rigging tray 36 will be described further herein below.

As mentioned, the rigging tray 36 can be placed in a retracted (installed) position (see FIGS. 3 and 4), in which the first end 40 of the rigging tray 36 is within the closed interior 30 of the cowl 20, and a second, opposite end 44 of the rigging tray 36 is proximate the opening 32 in the cowl 20. As shown herein, the second end 44 of the rigging tray 36 is located inside of the cowl 20, more specifically inside of the lower cowl portion 24, and is therefore situated just aft of the opening 32. However, in another embodiment, the second end 44 of the rigging tray 36 could be located within the opening 32 such that it is flush with the surface of the cowl 20, or could stick out of the cowl 20 slightly just fore of the opening 32. In either case, a different shape of ingress adapter and/or grommet (described below) would likely be needed, but major redesign of the rigging system would not be required.

Figure 5:
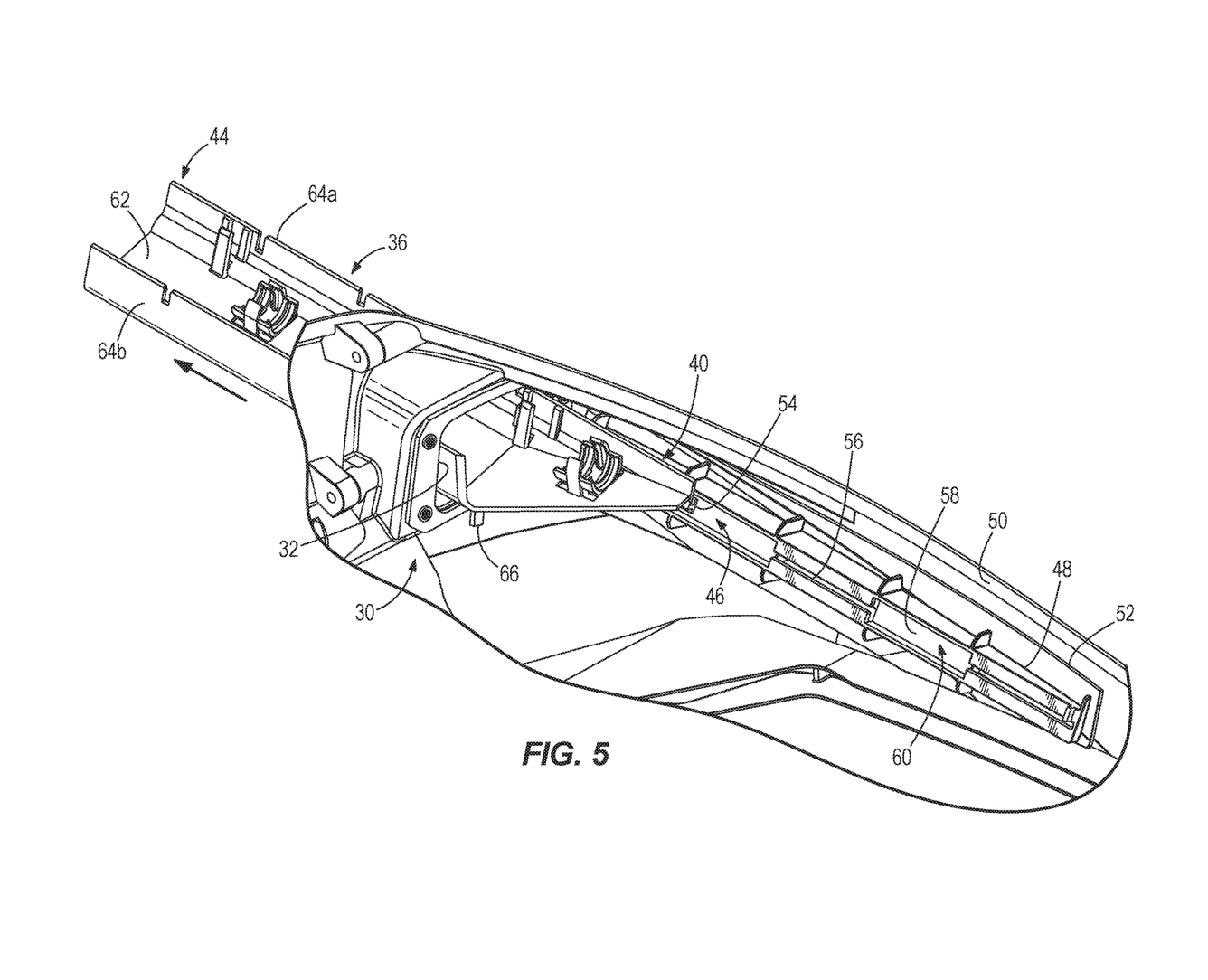
FIG. 5 illustrates a portion of the interior of the cowl, showing the rigging tray in the extended or withdrawn position.

The rigging tray 36 is designed to be removable through the opening 32 to an extended (withdrawn) position so as to provide access to the ends of the engine electrical lines 38 and the connectors 42 located therein (see FIGS. 2 and 5). In the extended position, the first end 40 of the rigging tray 36 is proximate the opening 32 through the cowl 20, and the second end 44 of the rigging tray 36 is exterior to the cowl 20. As shown herein, the first end 40 remains within the cowl 20, in the closed interior 30, and does not exit the opening 32. However, in other examples, the entire rigging tray 36 may be removable via the opening 32 such that the first end 40 is also exterior to the cowl 20, or the first end 40 might be positioned directly within the opening 32.

Referring to FIGS. 2-5, the rigging tray 36 includes a bottom panel 62 and a pair of opposing side edges 64a, 64b projecting upwardly from the bottom panel 62. Both the bottom panel 62 and the opposing side edges 64a, 64b extend from the first end 40 of the rigging tray 36 to the second end 44 of the rigging tray 36. At the first end 40, the rigging tray 36 is designed such that the bottom panel 62 tapers in a fore-aft direction, which is designed to allow for smooth access of the plurality of engine electrical lines 38 into the rigging tray 36, as well as to accommodate the shape of the engine 14. Alternatively, the first end 40 of the rigging tray 36 could be squared off, as is the second end 44. It should be noted that the rigging tray 36 could have many other cross-sectional shapes than that shown herein, such as a half oval, a half cylinder, or a half rectangle with differently shaped side edges, or could be a bottom panel 62 without any side edges at all. The bottom panel 62 need not be a solid panel, but could instead have a lattice-type pattern or could be provided with holes to reduce the amount of material used therein.

A linear support 46 may be provided to guide the rigging tray 36 as it moves through the opening 32 between the extended and retracted positions. The linear support 46 can be a device such as a linear way, a linear bearing, or a slide that facilitates reciprocation of the rigging tray 36 with respect to the closed interior 30 of the cowl 20 between the extended and retracted positions. In the example provided herein, the linear support 46 comprises a linear guide bracket 48 connected to an inner surface 50 of the cowl 20. The guide bracket 48 can include a flange 52 or backing plate that can be adhered, molded, fastened, or otherwise connected to the inner surface 50 of the cowl 20. Although here the guide bracket 48 and flange 52 are a single molded piece, they could instead be adhered, fastened, or otherwise connected to one another. In other examples, the guide bracket 48 can be directly connected to the inner surface 50 of the cowl 20, without provision of the flange 52.

Referring to FIGS. 2-7, the rigging tray 36 is connected to a guided member 54, which reciprocates with respect to the guide bracket 48. More specifically, the guided member 54 may be a T-shaped piece that is molded or adhered to an outer surface of the rigging tray 36. For example, as shown in detail in FIGS. 6 and 7, the stem 54b of the "T" of the guided member 54 is connected to the side edge 64a of the rigging tray, such as for example by having been co-molded with the side edge 64a. The cross-portion 54a of the "T" can be provided parallel the opposing side edge 64a of the rigging tray 36, and is designed to fit within a slot 56 in a channel 58 defined by the guide bracket 48. The slot 56 can be continuous along the entire length of the guide bracket 48, or can be left with several gaps 60 along the length of the channel 58 in order to allow for cleaning, greasing, or other maintenance of the guide bracket 48. Obviously, the guided member 54 is provided on the side edge 64a or 64b of the rigging tray 36 that matches the guide bracket 48 provided within the cowl 20, here, the starboard side. Note, however, that a mirror image of the assembly could be provided on the port side of the outboard motor if that is where the opening 32 is provided.

As the rigging tray 36 is moved between the retracted position and the extended position, it may be desirable to hold the rigging tray in one of these positions without fear that it will move on its own. For this reason, a positive stop 66 (FIGS. 5 and 7) such as a projection or tab may be provided at the first end 40 of the rigging tray 36. The positive stop 66 contacts the inner surface 50 of the cowl 20 when the rigging tray 36 is in the extended position and prevents the first end 40 of the rigging tray 36 from being removed from the opening 32. For example, the positive stop 66 projects from the rigging tray 36 enough that the rigging tray 36 cannot be fully removed through the opening 32 due to its size. Although the positive stop 66 is shown depending from a bottom surface of the bottom panel 62, the positive stop 66 could alternatively be provided extending outwardly from one or both of the side edges 64a, 64b, or upwardly from the bottom panel 62 or side edges 64a, 64b. Alternatively, the linear support 46 could be designed such that once the guided member 54 reaches the end of the guide bracket 48 that is near the opening 32, the guided member 54 or another part of the rigging tray 36 contacts the guide bracket 48 in such a way that the guided member 54 is prevented from being removed any further from the cowl 20. In other embodiments, the positive stop 66 is not provided, and the rigging tray 36 can be removed completely through the opening 32 in the cowl 20.

Referring to FIG. 2, once the rigging tray 36 is in the extended (or withdrawn) position, it may be desirable to prevent the rigging tray 36 from retracting back into the closed interior 30 of the cowl 20 on its own. This might happen, for example, if the engine electrical lines 38 are very taut after having been pulled from the closed interior 30, and tend to want to spring back toward the engine and pull the rigging tray 36 back into the closed interior 30. In order to prevent such unintended retraction, a spring catch 68 (FIGS. 2 and 7) may be provided proximate the first end 40 of the rigging tray 36. The spring catch 68 may contact the outer surface 70 of the cowl 20, more specifically the outer surface of the lower cowl portion 24, when the rigging tray 36 is fully extended from the opening 32. An upper end 68a of the spring catch 68 may be connected to a bottom surface of the bottom panel 62 of the rigging tray 36, while a lower end 68b of the spring catch 68 may be that which contacts the outer surface 70 of the cowl 20. Due to relative size, the lower end 68b of the spring catch 68 needs to be compressed before the rigging tray 36 can be reinserted through the opening 32 and back to the retracted position.

Figure 7:
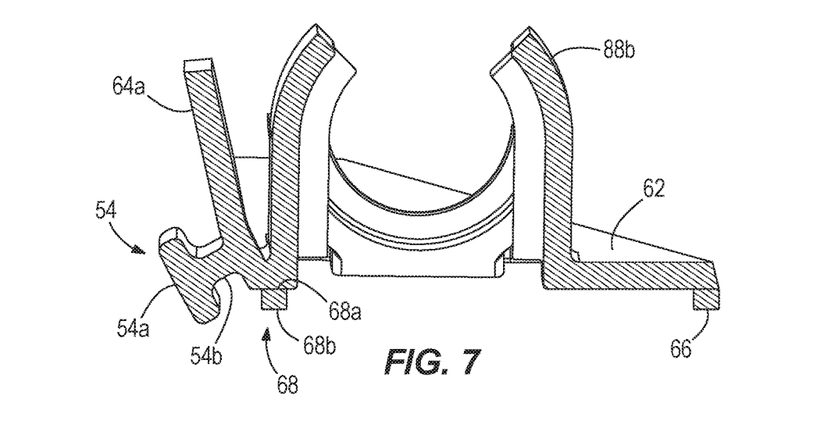
FIG. 7 provides a cross-section of the rigging tray, at the section labeled VII-VII in FIG. 3.

While the rigging tray 36 is in the retracted position, the spring catch 68 will be in a relaxed state, with the bottom end 68b of the spring catch 68 extended away from the bottom surface of the bottom panel 62. As the rigging tray 36 is slid through the opening 32 and the leading upper end 68a of the spring catch 68 contacts the opening 32, the spring catch 68 will gradually be compressed as it slides through the opening 32, until the following lower end 68b of the spring catch 68 is nearly flush with the bottom panel 62. Once the spring catch 68 has been fully removed from the opening 32, the bottom end 68b of the spring catch 68 will spring downward to provide a positive stop that prevents the rigging tray 36 from sliding back into the cowl 20 unless the spring catch 68 is re-compressed beforehand. In other examples, the spring catch 68 may be provided on the outside or upper edge of one or both of the side edges 64a, 64b of the rigging tray 36. In still other examples, no spring catch is provided.

Figure 6:
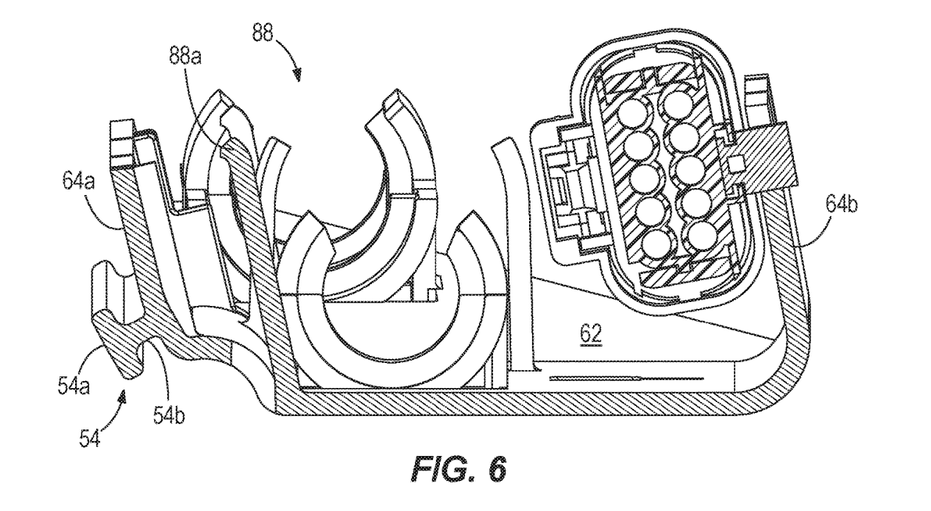
FIG. 6 provides a cross-section of the rigging tray, at the section labeled VI-VI in FIG. 3.

Turning now to FIGS. 3 and 6-7, the bottom panel 62 of the rigging tray 36 may include a plurality of hold downs 88 into which one or more of the plurality of engine electrical lines 38, the complimentary plurality of vessel electrical lines 28, and the plurality of connectors 42 can be inserted. Hold downs 88 can be provided at both the first end 40 of the rigging tray 36 and the second end 44 of the rigging tray 36. The hold down can be a simple U-shape, C-shape, or semi-cylindrical shape that is configured to hold the shape of the line it is associated with. For example, hold down 88b can be provided to hold engine electrical line 38b therein, before line 38b extends further to its respective connector. For example, line 38b can continue to a connector such as connector 42b, which may be a connector for, e.g., a 14-pin cable line that couples the engine 14 to an engine control unit (ECU) aboard the vessel. Although not shown herein, a vessel electrical line could extend from the opposite end of this connector 42b, from the second end 44 of the rigging tray 36, and to the ECU aboard the vessel. In one example, the connectors 42 can be adhered, molded, or otherwise connected to the rigging tray 36 while the rigging tray 36 is being manufactured. In another example, the connectors 42 may be pre-attached to the ends of the engine electrical lines 38 while the outboard 10 is being manufactured. In the latter instance, the connectors 42 can later be snapped into the hold downs 88 so that they can be held in the rigging tray 36. For example, connector 42a can be pre-connected during manufacturing to vessel electrical line 28a, and later during installation may be snapped into hold down 88a.

Returning to FIGS. 1 and 2, an ingress adapter 72 that can be used to hold the rigging tray 36 in the cowl 20 when it is in the retracted or installed position will now be described. The ingress adapter 72 includes a neck 74 and an adapter flange 76 that extends outwardly from an end of the neck 74 and that is configured to be proximate the outer surface 70 of the cowl 20. A plurality of vessel electrical lines 28, for example including lines 28a and 28b, extend from the marine vessel to which the outboard 10 is to be coupled and through the neck 74. (Again, more vessel electrical lines than those shown can be provided.) An inner circumference of the neck 74 may be threaded such that a protective tube can be provided around the plurality of vessel electrical lines 28 and threadedly engaged with the inner circumference of the neck 74. As described above, the plurality of vessel electrical lines 28 is configured to extend into the rigging tray 36 from the second end 44 thereof and to be connected to the plurality of electrical lines 38 extending from the engine 14 via the plurality of electrical connectors 42. After all of the engine electrical lines 38 are connected to the vessel electrical lines 28 within the rigging tray 36, the rigging tray 36 can be pushed along the linear support 46 into the retracted position. Once the rigging tray 36 is in the retracted position, the ingress adapter 72 is configured to be coupled to the cowl 20 over the opening 32 by way of the adapter flange 76, such as by way of threaded fasteners 78 provided through holes 75, 77 in the adapter flange 76 and in the outer surface 70 of the cowl 20, respectively. This installed position is shown in FIG. 1.

Returning to FIG. 2, an elastomeric grommet 80 may also be provided and held between the cowl 20 and the ingress adapter 72. The grommet 80 may have a plurality of holes 82 that seal around the complimentary plurality of vessel electrical lines 28 and provide a watertight seal there around. The holes 82 may therefore be sized to fit closely around the vessel electrical lines, such as lines 28a, 28b extending there through. The grommet 80 may include a body 84, such as the cylindrical body shown herein, that is shaped to fit closely within the neck 74 of the ingress adapter 72. This way, water cannot seep between the neck 74 of the ingress adapter 72 and the body 84 of the grommet 80. The grommet 80 may also include a grommet flange 86 that is about the same size and shape as the adapter flange 76 and that is configured to be sandwiched between the adapter flange 76 and the outer surface 70 of the cowl 20. Again, this prevents water from seeping between the adapter flange 76 and the outer surface 70 of the cowl 20 and into the opening 32. Holes 79 may be provided in the grommet flange 86 as well, for insertion of the fasteners 78.

It should be noted that the arrangement of the vessel electrical lines 28, the engine electrical lines 38, the connectors 42, their placement within the rigging tray 36, and the holes 82 in the grommet 80 are designed for a specific type of engine, and that multiple different configurations and arrangements could be provided depending on the type of engine, functions available on the engine, the size of the lines to be held within the rigging tray 36, and the size of the plurality of connectors 42. Thus, the specific arrangement shown herein, and the specific lines and connectors called out and/or described, are not limiting on the scope of the present disclosure. Rather, the rigging tray 36 is designed such that its first end 40 is configured to receive a plurality of engine electrical lines 38 that terminate in the rigging tray 36 at a plurality of electrical connectors 42, respectively. The rigging tray 36 also has a second end 44 that is configured to receive a complementary plurality of vessel electrical lines 28 for connection to the plurality of engine electrical lines 38 via the plurality of electrical connectors 42. As mentioned and described herein above, the rigging tray is configured to be inserted through the opening 32 in the cowl 20 to an installed position, in which a majority of the rigging tray 36 is within the closed interior 30 of the cowl 20. In this position, all of the vessel electrical lines 28 and engine electrical lines 38 are connected to one another via the connectors 42, and the outboard motor 10 is fully electrically installed on the transom of the marine vessel. The rigging tray 36 is also configured to be removed through the opening 32 to a withdrawn position, in which a majority of the rigging tray 36 is exterior to the cowl 20. In this position, the electrical lines 28, 38 can be connected or disconnected to and from one another in order to electrically install or uninstall the outboard motor 10 with respect to the marine vessel. The rigging tray 36 of the present disclosure thus provides the installer easy access to the engine electrical lines 38 and connectors 42 such that he can connect these to the vessel electrical lines 28 without needing to reach his fingers through a small hole in the cowl 20, without needing to remove the upper cowl portion 22 or the lower cowl portion 24, and in a manner where he can assure that all connections are tightly made.

Once the rigging tray 36 is pushed along the linear support 46 to the installed or retracted position, the above-noted grommet 80 can be placed over the opening 32 flush with the outer surface 70 of the cowl 20, and the ingress adapter 72 can be placed over the grommet. The holes 79, 75 in each of the grommet 80 and ingress adapter 72 can be lined up with similar holes 77 provided in the outer surface 70 of the cowl 20, and the noted fasteners 78 can be threaded through the holes in order to hold the ingress adapter 72 and grommet 80 tightly against the outer surface 70 of the cowl 20. In one example, a plate 90, such as a plate made of steel (see FIG. 3) can be provided on the inner surface 50 of the cowl 20 in order to provide strength to the connection between the cowl 20, grommet 80, and ingress adapter 72. In still other examples, the grommet 80 could be permanently connected to the second end 44 of the rigging tray 36, depending on the desires of the manufacturer. In that instance, the grommet 80 would move back and forth with the rigging tray 36 as it extends and retracts from and into the cowl 20.

In some examples, a fuel line can be provided to the engine 14 separately of the remainder of the vessel electrical lines 28. For example, the fuel line could be inserted through the ingress adapter 72 and a hole 82 in the grommet 80, but could then bypass the rigging tray 36. This might be desirable if the fuel line is made of a material that is different than the remainder of the electrical lines 28, 38, such that it has lesser ability to be stretched and/or folded as the rigging tray 36 is moved between the installed and withdrawn positions. In this instance, the fuel line could be inserted through the opening 32 separately from the plurality of connectors 42 in the rigging tray 36.

In the above description, certain terms have been used for brevity, clarity, and understanding. No unnecessary limitations are to be inferred therefrom beyond the requirement of the prior art because such terms are used for descriptive purposes and are intended to be broadly construed. The different systems described herein may be used alone or in combination with other systems. It is to be expected that various equivalents, alternatives and modifications are possible within the scope of the appended claims.

What is claimed is:

1. An outboard motor comprising:
an engine coupled in torque-transmitting relationship with a propulsor via a driveshaft;
a protective cowl that houses the engine within a closed interior thereof;
an opening in an outer surface of the cowl that provides access to the closed interior;
a rigging tray configured to be inserted through the opening to a retracted position, in which a majority of the rigging tray is within the closed interior; and
a plurality of electrical lines extending from the engine and into the rigging tray from a first end thereof, each electrical line in the plurality of electrical lines terminating in the rigging tray at a respective one of a plurality of electrical connectors;
wherein the rigging tray is removable through the opening to an extended position, in which a second, opposite end of the rigging tray is exterior to the cowl.

2. The outboard motor of claim 1, wherein in the retracted position, the first end of the rigging tray is within the closed interior and the second end of the rigging tray is proximate the opening.

3. The outboard motor of claim 2, wherein in the extended position, the first end of the rigging tray is proximate the opening.

4. The outboard motor of claim 3, further comprising a linear support that guides the rigging tray as it moves through the opening between the extended and retracted positions.

5. The outboard motor of claim 4, wherein the linear support comprises a linear guide bracket connected to an inner surface of the cowl and a guided member connected to the rigging tray, wherein the guided member reciprocates with respect to the guide bracket.

6. The outboard motor of claim 4, further comprising a positive stop at the first end of the rigging tray that contacts an inner surface of the cowl when the rigging tray is in the extended position and prevents the first end of the rigging tray from being removed through the opening.

7. The outboard motor of claim 4, further comprising a spring catch proximate the first end of the rigging tray that contacts the outer surface of the cowl when the rigging tray is in the extended position, wherein the spring catch must be compressed before the rigging tray can be inserted through the opening to the retracted position.

8. The outboard motor of claim 3, further comprising an ingress adapter having a neck that is configured to hold a complementary plurality of electrical lines extending from a vessel to which the outboard motor is to be coupled;
wherein the complementary plurality of electrical lines is configured to extend into the rigging tray from the second end thereof and to be connected to the plurality of electrical lines extending from the engine via the plurality of electrical connectors; and
wherein when the rigging tray is in the retracted position, the ingress adapter is configured to be coupled to the cowl over the opening by way of an adapter flange.

9. The outboard motor of claim 8, further comprising an elastomeric grommet configured to be held between the cowl and the ingress adapter, the grommet having a plurality of holes that seal around the complementary plurality of electrical lines.

10. The outboard motor of claim 9, wherein the grommet comprises a body that is shaped to fit closely within the neck of the ingress adapter and a grommet flange that is configured to be sandwiched between the adapter flange and the outer surface of the cowl.

11. The outboard motor of claim 8, wherein the rigging tray comprises a bottom panel including a plurality of hold downs into which one or more of the plurality of electrical lines, the complementary plurality of electrical lines, and the plurality of electrical connectors can be inserted.

12. The outboard motor of claim 1, wherein the cowl comprises an upper cowl portion and a lower cowl portion, and the opening is located on a front side of the outboard motor, just below a joint where the upper cowl portion meets the lower cowl portion.

13. A protective covering for an outboard motor's engine, the protective covering including:
a cowl that houses the engine within a closed interior thereof;
an opening in an outer surface of the cowl that provides access to the closed interior; and
a rigging tray including:
a first end configured to receive a plurality of engine electrical lines that terminate in the rigging tray at a plurality of electrical connectors, respectively; and
a second end configured to receive a complementary plurality of vessel electrical lines for connection to the plurality of engine electrical lines via the plurality of electrical connectors;
wherein the rigging tray is configured to be inserted through the opening to an installed position, in which a majority of the rigging tray is within the closed interior; and
wherein the rigging tray is configured to be removed through the opening to a withdrawn position, in which a majority of the rigging tray is exterior to the cowl.

14. The protective covering of claim 13, further comprising a linear support coupled to the cowl that guides the rigging tray as it moves through the opening between the installed and withdrawn positions.

15. The protective covering of claim 14, wherein the rigging tray comprises a bottom panel and a pair of opposing side edges projecting upwardly from the bottom panel, the bottom panel and the pair of opposing side edges extending from the first end to the second end of the rigging tray.

16. The protective covering of claim 15, wherein the linear support comprises a linear guide bracket connected to an inner surface of the cowl and a guided member connected to one of the pair of opposing side edges of the rigging tray, wherein the guided member reciprocates with respect to the guide bracket.

17. The protective covering of claim 15, wherein the bottom panel includes a plurality of hold downs into which one or more of the plurality of engine electrical lines, the plurality of vessel electrical lines, and the plurality of electrical connectors can be inserted.

18. The protective covering of claim 14, further comprising a positive stop at the first end of the rigging tray that contacts an inner surface of the cowl when the rigging tray is in the withdrawn position and prevents the first end of the rigging tray from being removed through the opening.

19. The protective covering of claim 18, further comprising a spring catch proximate the first end of the rigging tray that contacts the outer surface of the cowl when the rigging tray is in the withdrawn position, wherein the spring catch must be compressed before the rigging tray can be inserted through the opening to the installed position.

20. The protective covering of claim 13, wherein the cowl comprises an upper cowl portion and a lower cowl portion, and the opening is located on a front side of the cowl, just below a joint where the upper cowl portion meets the lower cowl portion.

* * * * *